(Model.)

E. O. SAWYER.
Belt Coupling.

No. 238,164. Patented Feb. 22, 1881.

Witnesses,
Franck L. Ourand
W. D. McKenny

E. Ogden Sawyer,
Inventor.

UNITED STATES PATENT OFFICE.

E. OGDEN SAWYER, OF DAYTON, OHIO.

BELT-COUPLING.

SPECIFICATION forming part of Letters Patent No. 238,164, dated February 22, 1881.

Application filed January 17, 1881. (Model.)

*To all whom it may concern:*

Be it known that I, E. OGDEN SAWYER, a citizen of the United States, residing at Dayton, in the county of Montgomery, State of Ohio, have invented a new and useful Belt-Fastener, of which the following is the specification.

My invention relates to improvements in belt couplings or fastenings for the ends of all kinds of machinery-belts, in which flaps extend over the ends of the belt on each side, having in said flaps face slots or grooves, in which the lacing or other devices for fastening rest for protection against friction and wear when running over pulleys. The said flaps are fastened to a central transverse strip or piece held between them, and form two joints where the belt is coupled instead of one, as is usual, thereby making the coupling more flexible, the whole making a good and substantial belt fastening or coupling.

The objects of my invention are, first, to provide a more even surface where the belt is joined, which causes the same to run smoothly, prevents jarring, and also prevents tearing the ends of the belts; second, it protects the lacing or other fastening devices used from friction and wear when running over pulleys; third, it makes the united portions more flexible by the use of a center piece, forming two joints. I attain these objects by the elements illustrated in the accompanying drawings, in which—

Figure 1:
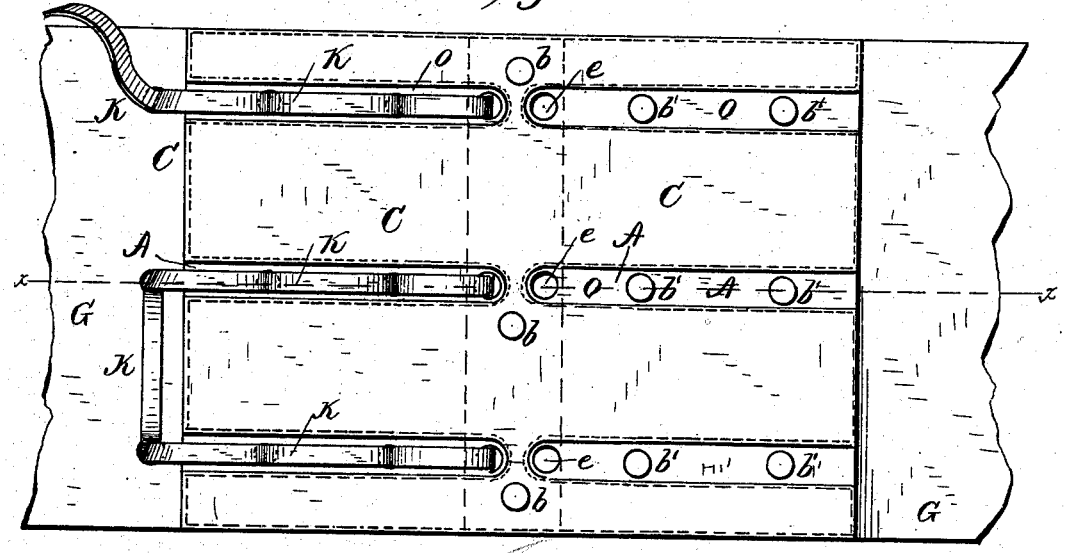

Figure 1 represents the surface next the pulley when in use. A represents flaps extending over the ends of the belt. *b* represents rivets through flap and center piece, and through the flap on opposite side, similar to the one already described. C represents raised surfaces to protect the lacing in the slots or grooves made thereby. K represents lacings, which attach the ends of the belt to center piece and flaps. *b'* represents holes to secure either rivets or lacing, to attach the ends of belts on side intended to be stationary.

Figure 2:
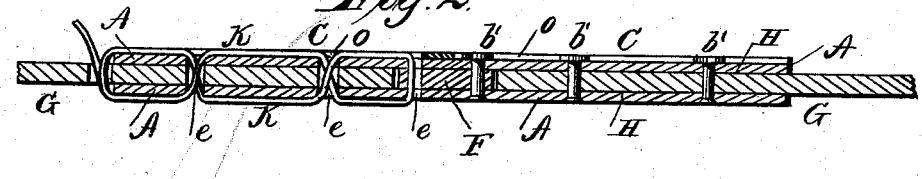

Fig. 2 represents a lateral section of coupling, showing an edge view of the lacing when the coupling is applied. F is the end of the center piece; H, the edges of inclosing-flaps. K is the lacing. A represents the flaps. O are slots made for lacing by reason of raised surfaces. G is end view of belt.

What I claim as my invention, and desire to secure by Letters Patent, is—

1. An improved belt coupling or fastening, consisting of two overlapping portions covering the joint of the belt, provided with face grooves or depressions adapted to receive the lacings which unite the several parts, all substantially as shown and described.

2. The combination, with the ends of a belt, of overlapping portions upon each side of and inclosing the ends, and a transverse strip intermediate the overlapping portions, all united by suitable fastenings to form a flexible covered joint, substantially as set forth.

E. OGDEN SAWYER.

Witnesses:
W. D. McKEMY,
A. H. BOWMAN.